Dec. 17, 1968  R. J. DALEY ET AL  3,416,847

COLD-START SHAFT BEARING

Filed Jan. 23, 1967  2 Sheets-Sheet 1

INVENTORS
ROGER J. DALEY
WILFRED W. HERDERHORST
BY
*Trask, Jenkins & Hawley*
ATTORNEYS Dec. 17, 1968 R. J. DALEY ET AL 3,416,847

COLD-START SHAFT BEARING

Filed Jan. 23, 1967 2 Sheets-Sheet 2

INVENTORS
ROGER J. DALEY
WILFRED W. HERDERHORST
BY

*Frank, Jenkins + Hawley*

ATTORNEYS

United States Patent Office 3,416,847
Patented Dec. 17, 1968

3,416,847
COLD-START SHAFT BEARING
Roger J. Daley and Wilfred W. Herderhorst, Fort Wayne, Ind., assignors to Tokheim Corporation, Fort Wayne, Ind., a corporation of Indiana
Filed Jan. 23, 1967, Ser. No. 610,861
10 Claims. (Cl. 308—37)

ABSTRACT OF THE DISCLOSURE

A self-aligning, oil-impregnated, sintered-bronze shaft bearing of the type used in small electric motors has its cold start and performance characteristics improved by slotting and severing the bearing ring at one point, and blocking the cut slot against compression, as by inserting a shim or by leaving an integral web which is subsequently cracked by stress.

Cross references

The motor-pump unit shown herein is more fully disclosed in Hudson U.S. Patent No. 2,885,126 and Wright and Clymer Patent No. 2,969,741. The thrust bearing and seal shown between the magnetic coupling members is the subject of our copending application Ser. No. 594,236 filed Nov. 14, 1966.

Background of the invention

This invention relates to a shaft bearing having improved start and performance characteristics at low temperature, and particularly to a self-aligning, oil-impregnated, sintered-metal shaft bearing of the type used in small electric motors.

A motor-pump unit to be mounted in an automotive fuel tank to pump gasoline or other fuel for use by the engine must be capable of operating at low temperatures. One vehicle manufacturer requires such a unit to pass a cold-test in which the 12-volt motor-pump unit is soaked in the fuel for 72 hours at —40° F.; then run for 10 seconds at 11 volts, discharging its delivery freely back to the tank; then run for 20 seconds at 8 volts with a minimum delivery of 9 gallons per hour.

Nine gallons per hour equals 6.4 ounces in 20 seconds, and in the tests reported in this specification, this is used to indicate a successful test, and is used as a unit to derive a "Performance Index." The "Performance Index" shows the relative delivery performance of the test units, and is the number of times the test delivery exceeds the minimum unit delivery of 6.4 ounces in 20 seconds. That is, a delivery of 6.4 ounces in 20 seconds gives an Index of 1.0, a delivery of twice that amount gives an Index of 2.0, etc.

Specifications for equipment of this character supplied to the Armed Services commonly call for cold-tests at —65° F. The present invention provides improved cold starting and performance characteristics both at the —40° F. required by the automotive manufacturer and at the —65° F. required by the Armed Services.

While not limited thereto, the invention is particularly concerned with self-aligning shaft bearings of the type used in small electric motors. Conventionally, such a bearing comprises a relatively thick-walled ring of a suitable bearing metal, such as sintered bronze, sintered aluminum, sintered iron or sintered steel, the bearing adapted to be oil impregnated and having an axial opening for the reception of the shaft. At its outer periphery, the ring forms a pair of spaced oppositely-disposed spherical shoulders, about a common center, by which the bearing is mounted. The wall thickness may be of the same order as the radius of the shaft opening, so that the ring is a relatively rigid and self-supporting structure.

In a conventional mounting, the spherical shoulder at one end of the bearing is received in a spherical seat, and the opposite end is engaged by a spring retainer which urges the bearing into the spherical seat. The spherical shape permits the bearing to align itself with the shaft.

Under low temperature conditions, it is to be expected that the thick-walled metal ring will contract about the shaft to lock or retard the shaft against rotation. We assumed that if the complete ring was interrupted, the contraction would be relieved and satisfactory cold performance might be obtained. Accordingly, a number of conventional sintered-bronze bearings were modified by cutting a diagonal slot radially through the wall of the ring with a thin saw. Tests of motors equipped with these bearings at —40° F. and —65° F. were not satisfactory, although they showed some improvement over conventional solid-ring bearings.

Summary of the invention

In accordance with the present invention, the circumferential continuity of the bearing ring is interrupted at one point, as by a slot, and the slot is blocked open to prevent compressive contraction of the ring. The slot may be in an axial plane or may be diagonal. For production manufacture, it is convenient to make a straight or axial slot. The slot may be cut completely through the wall and blocked open with an inserted spacer or shim. For ease of production, however, the slot is preferably cut only part way through the wall of the ring, from the inside outward or from both the inner and the outer peripheries toward a mid-point, and an integral web is left across the slot, which is then cracked by stressing the ring. The web may be cracked by forcing a tapered wedge into the slot already cut. The cracked web should be disposed outward from the shaft-receiving bore of the bearing ring, and is preferably at the outer periphery of the bearing ring.

We are not certain of the manner in which the invention operates to improve the cold performance characteristics of the bearing, and we do not fully know the conditions which are imposed on the bearing when turning torque is applied to the shaft at low temperatures. However, we believe the bearing may tend to be thrust or wedged into the spherical seat by its retaining spring, and if a split bearing becomes wedged in its seat when contracted by cold, it may be held by the seat against expansion when the shaft seeks to turn. In our invention, we believe the spacer or web which blocks the slot open also serves to support the ring against being compressed about the shaft and held so compressed by the mounting seat. Accordingly, we consider that the invention also involves the combination of the bearing ring with a self-alignment mounting.

Brief description of the drawings

The accompanying drawings illustrate the invention. In such drawings.

*Description of the preferred embodiments*

Figure 1:
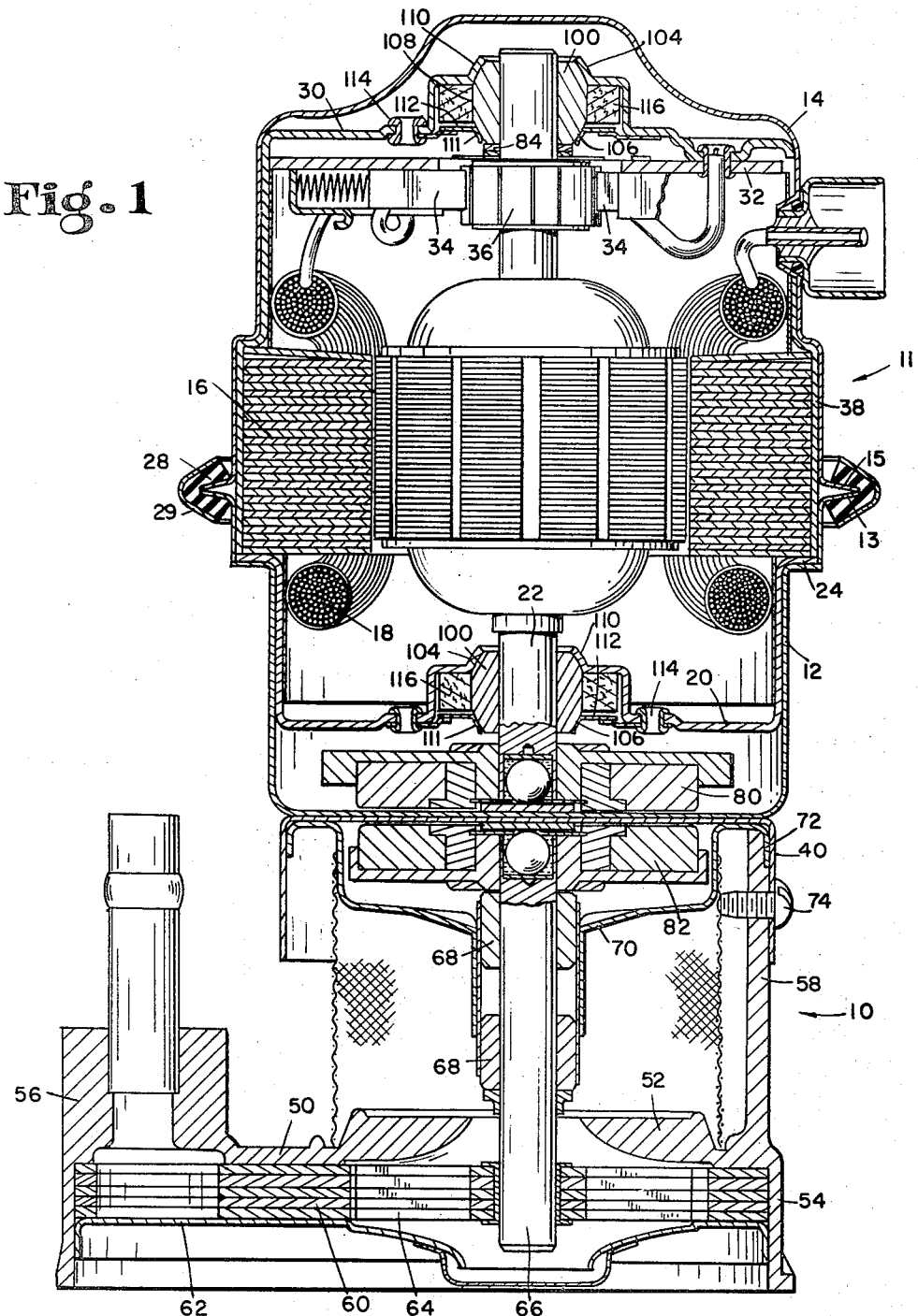
FIG. 1 is a longitudinal sectional view of a pump-motor unit in which the motor armature shaft is carried in bearings of the type with which this invention is especially concerned.

The motor and pump unit shown in FIG. 1 comprises a pump assembly 10 mounted at the lower end of a sealed motor assembly 11.

The motor assembly 11 comprises a casing formed by two hat-shaped shells 12 and 14 which support and enclose a stator core 16 and stator windings 18. A cup-shaped bottom frame member 20 supports a lower shaft bearing 100 for the amature shaft 22. An upper frame member 30 supports an upper shaft bearing 100 for the armature shaft 22 and carries a brush plate 32 on which brushes 34 are mounted for engagement with the commutator 36 of the motor. The side wall 38 of the upper frame member extends downward around the stator core 16 into abutting relation with a flange 24 at the upper end of the lower frame member 20. The two frame members 20 and 30 are engaged by shoulders of the hat-shaped shells 12 and 14, and the shells are joined by welding together narrow radial flanges 13 and 15 at their adjoining edges, to secure the motor in assembled relation and to close the housing. The circumferential rib formed by the welded-together flanges 13 and 15 may be used to mount the motor and pump unit, and to this end, is received in a resilient mounting gasket 28 held by a mounting collar 29.

The lower end wall of the motor shell 12 carries a downwardly open cup 40 for mounting the pump 10, and the flat wall of the cup is joined to the bottom wall of the shell 12 to form an imperforate end wall on the motor assembly. This is of stainless steel or other non-magnetic material to permit the passage of flux by which magnetic coupling members on opposite sides of such wall are operatively connected.

The pump assembly comprises a cast body 50 which forms a top end wall 52 for the pump, a depending outer skirt wall 54, an outlet boss 56, and four angularly spaced posts 58 by which the pump body may be held in spaced assembled relation with the motor sub-assembly 11. The pump chamber is formed by a stack of suitably punched laminations 60 received within the skirt wall 54 and held by an end plate 62 pressed into place. The pump rotor is formed by a stack of punched laminations 64 held together by an eyelet pressed onto the pump shaft 66.

The pump shaft 66 is mounted in a pair of sleeve bearings 68 held in a drawn stamping 70, the upper outer portion of which forms a downwardly open annular channel 72 which is received over the upper ends of the spaced posts 58, within the cup-shaped member 40. The assembly is held together by one or more screws 74 threaded through the wall of the cup-shaped member 40 into the posts 58.

The pump shaft 66 is coupled to the motor shaft 22 by a magnetic coupling consisting of a driving member 80 mounted on the lower end of the motor shaft 22, and a driven member 82 mounted on the upper end of the pump shaft 66. Each coupling member contains a ring magnet having a plurality of poles, as more fully described in Hudson U.S. Patent No. 2,885,126, and magnetic flux couples the two coupling members for synchronous rotation. It is characteristic of this coupling that in the event the pump should become locked, for example by the freezing of fuel-contaminating water in the pump, the coupling will release and allow the motor to rotate with little drag. Under these conditions, however, the relatively-rotating magnets will produce alternating attractive and repulsive thrust forces on the motor and pump shafts.

The tractive force between the magnetic coupling members 80 and 82 is taken by thrust bearing means more fully described in our aforesaid co-pending application. Repulsive thrust force on the motor shaft is taken by a thrust bearing formed by washers 84 between a shoulder at the upper end of the commutator 36 and the lower face of the top shaft bearing 100.

Each motor shaft bearing 100 comprises a thick-walled ring of the general configuration shown in FIGS. 1–5. Its inner periphery defines a cylindrical bearing surface 102 for the shaft. Its outer periphery includes two opposite spherical shoulders 104 and 106, formed about a common center, and separated by a central cylindrical portion 108.

Each bearing is mounted in a bearing holder formed in a frame member 20 or 30. Its upper spherical shoulder 104 is received in a spherical seat 110, and its lower shoulder 106 is engaged by a spherical collar 111 formed on a spring retainer 112 secured to the frame member 30 by a series of spaced rivets 114.

Desirably the bearing is made of porous sintered-bronze, which is impregnated with oil before the bearing is installed. Additional oil is retained in a reservoir pad 116 surrounding the central portion 108 of the bearing.

The mounting of each bearing on spherical surfaces between a fixed seat 110 and a resilient retainer 112 gives the bearings adequate support while permitting them to swivel in their mountings as necessary to align themselves coaxially with the shaft 22.

Figure 2:
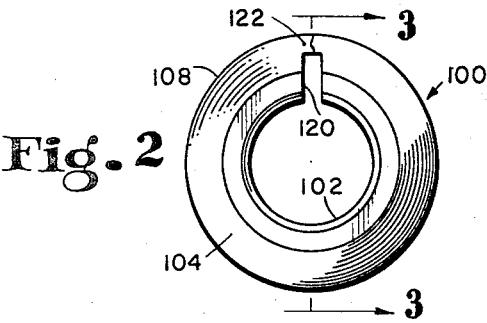
FIG. 2 is an end elevation of a bearing ring embodying the invention.
Figure 3:
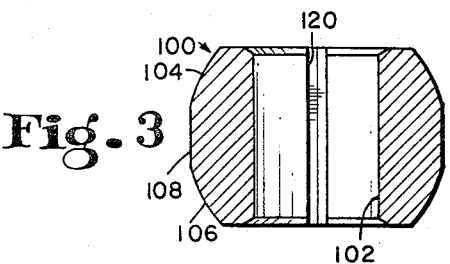
FIG. 3 is an axial section taken on the line 3—3 of FIG. 2.

In accordance with the present invention, the bearing 100 is preferably made as shown in FIGS. 2 and 3. The thick-walled ring-shaped body of the bearing 100 is cut from its inner periphery 102 outward in an axial plane to form a slot 120 which extends toward but not completely to the outer periphery of the ring, and an integral portion of the body is left as a web 122 at that outer periphery in the slotting operation. This may be a relatively thin web, say of the order of 0.015 inch in a bearing having an outer diameter of the order of 0.6 inch and a wall thickness of 0.15 inch, which is equivalent to about one-tenth the wall thickness. The thickness shown in the drawing is exaggerated for clarity.

The slot 120 is conveniently cut by a broaching operation. After the slot has been cut, a tapered wedge, which may be formed on the broach, is driven into the slot to spread the slot sufficiently to crack the integral web 122, so that it remains as a spacer which prevents contraction but permits expansion of the ring and the slot. The amount of spreading required to produce the crack is minimal when the web 122 is a narrow web located at the outer periphery of the bearing ring, and in such case the cracking operation can be performed without deforming the ring beyond its elastic limits so that no re-sizing of the bearing ring is required after the cracking operation. If the web is located at or near the inner periphery of the bearing ring, a re-sizing operation is desirable and may be necessary after the cracking operation.

Figure 4:
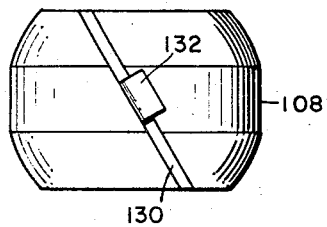
FIG. 4 is a side elevation of a modified bearing having a diagonal slot and an inserted slot spacer.
Figure 5:
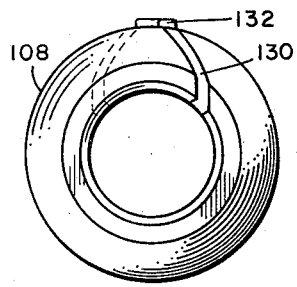
FIG. 5 is an end elevation of the bearing of FIG. 4.

FIGS. 4 and 5 show a modification of the preferred bearing. Instead of supporting the slotted bearing ring against compression by means of a cracked integral web, corresponding support is obtained by inserting a wedge or spacer into a completely cut-through slot. In this modification of FIGS. 4 and 5, the slot 130 is cut diagonally instead of in an axial plane, and is cut completely through the thickness of the ring wall. To support the slot 130 against compression, an L-shaped spacer 132 is formed from shim stock, one leg of this is inserted in the slot 130 and the other leg lies against the outer periphery 108 of the bearing ring and serves as a locating stop for the spacer. While some of our best test results were obtained with a bearing of this construction, it is relatively expensive to make and we prefer the construction of FIGS. 2 and 3 for production manufacture.

A series of tests were conducted on pumps having bearings of different construction. The test consisted of soaking the motor pump unit in a tank of fuel for a prolonged period of at least 24 hours, at the test temperature. After such soaking period, the motor-pump unit was run for a warm-up period of ten seconds at a predetermined voltage, with the delivery discharged back to the tank. The unit was then run for a test period of 20 seconds, and the delivery measured. A delivery of 9 gallons per hour or 6.4 ounces in 20 seconds was required for a successful test, and the degree of success was indicated by a "Performance Index" as described above, which indicated the proportion by which the delivered amount of fuel exceeded the minimum unit of 6.4 ounces per 20 seconds. The motors used were all nominally rated at 12 volts. For the −40° F. tests, the initial 10 seconds of operation was at 11 volts and the test period of 20 seconds was at 8 volts, in accordance with the specification of the vehicle manufacturer. For tests at −65° F., the 10 seconds starting period was at 13.5 volts and test delivery period was at 8.0 volts. Amperage during each test period was recorded to indicate the power consumption.

Two models of motor-pump units were tested. One model was made of components such as have been used in production of commercial units, except for the motor bearings. The second model was similar except that it used a higher-power motor and an improved thrust bearing. Some units failed because of defective parts or assembly and these have been excluded from the test results. The units with higher-power motors are identified with an asterisk in the test-result table given below.

Tests were made with bearings as shown in FIGS. 2–3 and FIGS. 4–5, and also with bearings as shown in FIGS. 6 to 10.

Figure 6:
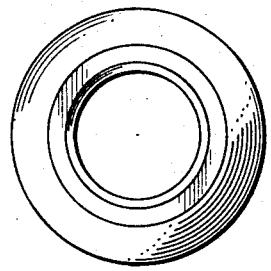
FIG. 6 is an end elevation of a conventional solid-ring bearing.

The bearing of FIG. 6 is a conventional solid-ring bearing. The tests made with these conventional bearings were made on periodic samples withdrawn from production for quality control purposes and the 100 units reported below constituted all such samples tested during an arbitrary period.

Figure 7:
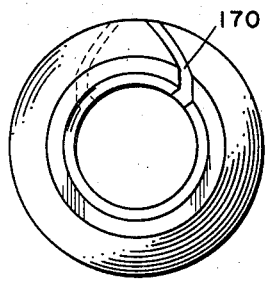
FIG. 7 is an end elevation of a diagonal-slotted ring bearing, like that of FIGS. 4–5 without the spacer.

The bearing of FIG. 7 was a conventional bearing in which a diagonal radial slot 170 was sawed completely through the wall of the ring.

Figure 8:
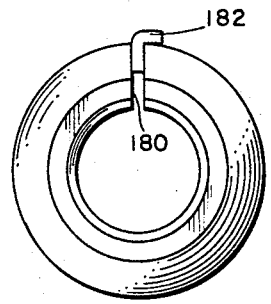
FIG. 8 is an end elevation of an axially slotted bearing ring with an inserted spacer.

The bearing of FIG. 8 was made from a conventional ring by sawing a straight or axial slot 180 through the wall, and inserting one leg of an L-shaped spacer 182 in the outer portion of the slot, between the spherical mounting shoulders.

Figure 9:
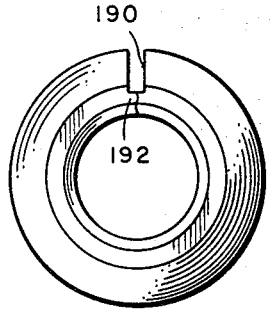
FIG. 9 is an end elevation of a partially slotted bearing ring with a cracked integral web at the inner periphery of the ring.

The bearing of FIG. 9 was made by sawing a straight radial slot 190 inward from the outer periphery, but leaving an integral web 192 at the inner periphery, and cracking the web by mechanically spreading the slot 190. The bearings were re-sized after the cracking operation.

Figure 10:
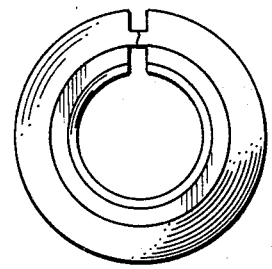
FIG. 10 is an elevation of a partially slotted bearing ring, slotted from both the inner and outer peripheries and with an integral cracked web at a midpoint in the wall of the ring.

The bearing shown in FIG. 10 was made by broaching slots from both the inner and outer peripheries, to leave an integral web at an intermediate point. The web was cracked by forcing a wedge into one slot, and the bearings were then re-sized to eliminate distortion caused by the cracking operation.

The following table shows the results of tests with the different bearings indicated. In each case, the "Performance Index" figure given is the average index for all the pumps which passed the test.

In the table, the first column identifies the bearing tested. The second column gives the number of pumps tested with the identified bearing. Some pumps were tested both at −40° F. and at −65° F., and some were tested more than once at the same temperature; and the third column gives the total number of tests conducted with the given number of pumps.

TABLE I

| Bearing tested | Number of pumps tested | Total Number of tests | Tests at −40° F. | | | Tests at −65° F. | | |
| --- | --- | --- | --- | --- | --- | --- | --- | --- |
| | | | Failed | Passed | Performance Index | Failed | Passed | Performance Index |
| Solid Ring, Fig. 6 | 100 | 100 | 65 | 35 | 2.9 | | | |
| Diagonal Slot, Fig. 7 | 5 | 10 | 1 | 4 | 3.61 | 4 | 1 | 4.51 |
| Diagonal Slot with Spacer, Figs. 4–5 | 5 | 30 | 0 | 15 | 9.36 | 0 | 15 | 8.09 |
| Straight Slot with Spacer, Fig. 8 | 6 | 30 | 0 | 18 | 7.45 | 0 | 12 | 5.82 |
| Part Slot Inner Web, Fig. 9 | 6 | 6 | | | | 6 | 0 | |
| Part Slot Mid Web, Fig. 10 | 6 | 60 | 3 | 33 | 4.16 | 6 | 18 | 3.68 |
| Part Slot Outer Web, Figs. 2–3 | *18 | 64 | | | | 3 | 61 | 5.08 |
| | 6 | 6 | | | | 0 | 6 | 6.28 |
| | *9 | 27 | | | | 0 | 27 | 4.78 |
| | *19 | 38 | 0 | 19 | 7.55 | 0 | 19 | 6.30 |
| | *10 | 40 | 0 | 20 | 7.75 | 0 | 20 | 5.57 |

* Higher-power motor.

A group of four production-model pumps (A, B, C, D) and four experimental pumps (E, F, G, H) which had previously been tested at −40° F. with conventional solid ring bearings were disassembled sufficiently to replace their motor bearings with bearings made as shown in FIG. 8, i.e. with a straight radial slot 180 and a spacer 182 of shim stock. These were then tested at −65° F. and the results compared with the results of the previous tests on the same motors with conventional bearings. The results are shown in the following Table II.

TABLE II

| | Performance Index | |
| --- | --- | --- |
| | Tests at −40° F.— With solid-ring bearings | Tests at −65° F.— Bearing ring slotted and Spacer |
| Production Pump: | | |
| A | Failed | 6.87 |
| B | Failed | 6.8 |
| C | Failed | 5.46 |
| D | Failed | 6.08 |
| Experimental Pump: | | |
| E | 2.81 | 8.12 |
| F | 4.53 | 9.36 |
| G | 2.97 | 10.00 |
| H | 6.53 | 9.05 |

In each case the performance of the pump was materially improved by replacing the standard bearings with bearings in accordance with the present invention.

The foregoing specification and the accompanying drawings show preferred embodiments of the invention. We do not intend that our patent protection be limited to such preferred embodiments, but that it be construed to fairly protect our contribution to the art.

We claim:

1. A shaft bearing of the type comprising a thick-walled closed ring defining a shaft bearing at its inner periphery and having mounting means at its outer periphery, said mounting means comprising a wedging seat for the bearing ring and means yieldingly urging the ring against said seat, said seat and urging means coacting to tend to compress the bearing ring about the shaft, wherein the improvement comprises, a slot in said ring open to the inner periphery thereof, the ring being severed at the circumferential location of such slot, and means blocking the slot open to prevent compressive contraction of the ring while allowing expansion thereof.

2. A shaft bearing as set forth in claim 1 wherein said blocking means comprises an integral web bridging the slot, said web being cracked to sever the ring.

3. A shaft bearing as set forth in claim 2 wherein said web is adjacent the outer periphery of the ring and said slot extends from the inner periphery of the ring to the web.

4. A shaft bearing as set forth in claim 3 wherein said ring is composed of porous sintered bronze and said mounting means comprises oppositely-disposed spherical shoulders about a common center.

5. A shaft bearing as set forth in claim 2 wherein said web is intermediate the thickness of the ring and the crack therein extends between inner and outer slots in the ring.

6. A shaft bearing as set forth in claim 2 wherein the web wall thickness is of the order of one-tenth the bearing wall thickness.

7. A shaft bearing as set forth in claim 1 wherein the slot extends through the wall thickness and the blocking means comprises an inserted spacer.

8. A shaft bearing as set forth in claim 1 wherein the mounting means on said bearing ring comprises a formed shoulder adapted to be received in a mounting seat and to permit self-aligning swivel movement of the ring in the seat, in combination with a formed seat supporting such shoulder, and a retainer urging said ring into said seat.

9. A bearing combination as set forth in claim 8 with the addition that said ring includes a thrust face disposed oppositely from said formed shoulder, and thrust bearing means positioned to engage said thrust face.

10. A shaft bearing as set forth in claim 1, wherein said ring comprises a porous sintered-bronze ring in which said slot extends from the inner periphery toward the outer periphery, leaving an integral web adjacent the outer periphery of the ring, and said web is cracked to allow expansion of the ring and slot but to prevent contraction thereof, and said mounting means comprises oppositely disposed spherical shoulder portions at the opposite ends of the ring, in combination with a mounting support having a spherical seat in which one of said shoulders is received, and a retainer engaging the opposite spherical shoulder and urging the ring into said seat, the ring having self-aligning swivel movement in said seat and retainer, said shoulders engaging said ring in compressive relation, and said integral web being positioned to prevent compressive contraction of the ring within said seat.

References Cited

UNITED STATES PATENTS

| | | | |
|---|---|---|---|
| 2,316,693 | 4/1943 | Hoddy | 308—72 X |
| 2,648,578 | 8/1953 | Stearns et al. | 308—196 |
| 2,702,216 | 2/1955 | Stearns | 308—196 |
| 3,009,747 | 11/1961 | Pitzer | 308—71 |

FOREIGN PATENTS 1,105,716  7/1955  France.

MARTIN P. SCHWADRON, *Primary Examiner.*

C. M. LEEDOM, *Assistant Examiner.*

U.S. Cl. X.R.

308—72, 196